(12) United States Patent
Katsaros

(10) Patent No.: US 12,270,438 B2
(45) Date of Patent: Apr. 8, 2025

(54) BEARING UNIT

(71) Applicant: AKTIEBOLAGET SKF, Gothenburg (SE)

(72) Inventor: Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 56 days.

(21) Appl. No.: 18/324,721

(22) Filed: May 26, 2023

(65) Prior Publication Data

US 2024/0003385 A1 Jan. 4, 2024

(30) Foreign Application Priority Data

Jun. 30, 2022 (DE) .......................... 102022206714.2

(51) Int. Cl.
*F16C 33/58* (2006.01)
*B60B 27/00* (2006.01)
*F16C 19/38* (2006.01)

(52) U.S. Cl.
CPC ........ *F16C 33/585* (2013.01); *B60B 27/0078* (2013.01); *F16C 19/38* (2013.01); *F16C 2326/02* (2013.01)

(58) Field of Classification Search
CPC .... F16C 19/385; F16C 19/386; F16C 19/525; F16C 33/583; F16C 33/585; F16C 33/586; F16C 33/60; F16C 33/605; F16C 35/06; F16C 35/061; F16C 35/067; F16C 35/07; F16C 35/077; F16C 2326/02; B60B 27/0078
See application file for complete search history.

(56) References Cited

U.S. PATENT DOCUMENTS 11,028,875 B1 * 6/2021 Chinitz ................. F16C 19/364
2002/0015545 A1 * 2/2002 Griseri ................... B60B 27/02
384/589

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A bearing unit includes at least one first ring and at least one second ring, the at least one first ring and the at least one second ring being rotatable relative to each other and defining a bearing interior between them. Each first ring is designed to be attached to a component with a press fit, the component being formed from a first material with a first coefficient of thermal expansion. The first ring(s) is/are formed from a second material with a second coefficient of thermal expansion that is different than the first coefficient of thermal expansion and the first ring(s) are provided, on a side facing the bearing interior, with at least one insert element. The insert element(s) are formed from a third material with a third coefficient of thermal expansion, the third coefficient of thermal expansion being at least as great as the first coefficient of thermal expansion.

14 Claims, 2 Drawing Sheets

BEARING UNIT

CROSS-REFERENCE

This application claims priority to German patent application no. 102022206714.2 filed on Jun. 30, 2022, the contents of which are fully incorporated herein by reference.

BACKGROUND OF THE INVENTION

The present invention relates to bearings, and more particularly to plain bearings for automotive applications.

In many industries, such as the automotive industry, it is desirable to design components as light as possible in order to save energy and/or fuel. For this reason, components are often used together that are comprised of different materials and therefore also have different coefficient of thermal expansions. A common technique for connecting two components together is referred to as a "press fit" in which the two components are pressed together. However, if the two interconnected components have different coefficients of thermal expansions, at conditions such as a high operating temperature, the component with the higher coefficient of thermal expansion expands to a greater degree than the component with the lower coefficient of thermal expansion. Conversely, at lower operating temperatures, the component with the higher coefficient of thermal expansion shrinks to a greater degree than the component with the lower coefficient of thermal expansion. This effect causes the overlap of the press fit to decrease with rising or increasing temperatures, and on the other hand, to decrease with decreasing or falling temperatures.

For example, in the case of a wheel bearing assembly with a light-metal hub and a bearing unit with bearing rings made of steel pressed into the light-metal hub, at high operating temperatures, the light metal hub can expand to the extent that the entire bearing unit rotates within the hub. In order to ensure a sufficiently secure press fit of the bearing unit within the hub at high operating temperatures, a relatively large overlap or interference must therefore be provided between the hub and the bearing unit. However, such a large overlap/interference could become so extreme at low operating temperatures that circumferential loading in the hub may reach or even exceed the material limit, such that cracking may result. Even if the relatively light metal hub does not crack or otherwise fracture, the high degree of shrinkage of the hub can cause the bearing unit to experience relatively high friction or even cause jamming during rotation. For these reasons, the upper and/or lower boundaries of the operating temperature range is restricted, because the overlap connection may not safely operate within a broader temperature range without risk.

SUMMARY OF THE INVENTION

It is therefore an object of the present invention to provide an improved bearing unit that can be safely secured by press fit in another component that has a different coefficient of thermal expansion than the bearing unit and safely operated over an entire temperature range.

This object is achieved by a bearing unit comprising at least one first ring and at least one second ring, the at least one first ring and the at least one second ring being rotatable relative to each other and defining a bearing interior between the at least one first ring and the at least one second ring. A component is formed of a first material with a first coefficient of thermal expansion, the at least one first ring being configured to be attached to the component with a press fit and formed from a second material with a second coefficient of thermal expansion different than the first coefficient of thermal expansion. An insert element provided on the at least one first ring on a side facing the bearing interior, the at least one insert element being formed from a third material with a third coefficient of thermal expansion, the third coefficient of thermal expansion is substantially at least as high as the first coefficient of thermal expansion.

More specifically, the bearing unit includes at least one first ring and at least one second ring, wherein the at least one first ring and the at least one second ring are rotatable relative to each other about a rotational axis and define a bearing interior between them. In particular, the first ring can be a rotating ring and the second ring can be a stationary ring. However, it is also conceivable that the first ring is a stationary ring and the second ring is a rotating ring. The component can also be part of a larger device. For example, the component can be a hub, a shaft, or the like. The first ring is designed to be attached to a component by press fit, wherein the component is formed from a first material with a first coefficient of thermal expansion. Furthermore, the at least one ring is formed from a second material with a second coefficient of thermal expansion that is different from the first coefficient of thermal expansion. The second coefficient of thermal expansion is preferably lower than the first coefficient of thermal expansion.

In order to reliably secure the bearing unit by press fit in the component over the entire operating temperature range, the at least one ring is provided with an insert element on a side facing toward the bearing interior, the insert element being formed from a third material with a third coefficient of thermal expansion. The third coefficient of thermal expansion is substantially at least as high as the first coefficient of thermal expansion.

In the present application, the expression "the third coefficient of thermal expansion is substantially at least as high as the first coefficient of thermal expansion" is understood to mean that the third coefficient of thermal expansion is at most 30%, preferably 20%, still more preferably 10%, lower than the first coefficient of thermal expansion. In other words, the third coefficient of thermal expansion can have a value that corresponds to at least 70%, preferably 80%, even more preferably 90% of the value of the first coefficient of thermal expansion.

The third coefficient of thermal expansion can preferably be substantially equal to the first coefficient of thermal expansion. In the following, the term "substantially equal coefficient of thermal expansion" is understood to mean that the first and the third coefficient of thermal expansion differ from each other by no more than 30%, preferably 20%, still more preferably 10%.

Since the at least one insert element has a coefficient of thermal expansion that is substantially at least as high as the coefficient of thermal expansion of the component, the at least one insert element expands together with the component at high operating temperatures or contracts together with the component at low operating temperatures. In other words, at high operating temperatures the at least one insert element expands to a greater degree than the at least one first ring so that the at least one insert element deforms the at least one first ring. A secure fit of the bearing unit in the component can thus be guaranteed even when, due to the high operating temperature, the component expands to a greater degree than the at least one first ring. In the case of a low operating temperature, the at least one insert element contracts together with the component so that the deformation of the at least one first ring by the at least one insert element decreases as the temperature becomes lower. This makes it possible to avoid a failure of the first component and/or a blocking or disrupting of the bearing function.

According to a further embodiment, the at least one insert element is disposed within a region in which a material thickness of the at least one first ring in the radial direction is as small as possible. For example, the at least one insert element can be disposed within a recess and/or a groove in the at least one first ring. This has the advantage that the insert element can more easily deform the at least one first ring in order to secure the position of the at least one first ring in the component. The at least one first ring preferably has a smaller or lesser material thickness in the radial direction in the region of the at least one insert element; in other words, the at least one first ring has a reduced radial thickness within the region of the at least one insert element. For example, the side of the at least one first ring facing the bearing interior, such as an inner surface as depicted, may be provided with a recess into which the at least one insert element is inserted. The at least one insert element is preferably inserted into the at least one recess with a press fit.

Furthermore, the bearing unit can be a rolling-element bearing unit that includes at least one first row of rolling elements and a second row of rolling elements, wherein the at least one insert element is provided midway between, or disposed between, the two rolling element rows in the axial direction. This has the advantage that the insert element can be disposed in an area in which there is usually a free area in the bearing interior so that the insert element can also be integrated into an already existing rolling-element bearing design. Furthermore, due to the central arrangement of the at least one insert element in the bearing unit, a secure-as-possible fit of the bearing unit in the component can be ensured. The rolling bodies can in particular be tapered rollers, cylindrical rollers, and/or balls.

Alternatively or additionally, the at least one insert element can be disposed on an axial outer side of the bearing unit. In particular, the at least one insert element can be disposed on a shoulder of the at least one first ring. For example, the at least one insert element can be provided in a region where a seal unit is usually inserted. The bearing unit can preferably include more than one insert element. For example, the bearing unit can be provided with a first insert element and a second insert element, wherein the first insert element is disposed on a first axial outer side of the bearing unit, and the second insert element is disposed on a second axial outer side opposite the first axial outer side. This makes it possible to ensure a particularly good securement of the bearing unit within the component at high operating temperatures. Furthermore, a third insert element can also be provided in the center of the bearing unit. The at least one first ring can thus be deformed locally in three regions so that the bearing unit can be secured in the component.

According to a further embodiment, the first bearing ring is a two-piece ring with a first part and a second part, wherein the at least one insert element is disposed within a region at which the first and the second part abut against each other. With two-part rings, a recess in which the insert element can be fitted is advantageously usually already provided in the region in which the two ring parts abut against each other.

Furthermore, a ratio of the material thicknesses in the radial direction, i.e., the radial thickness, between the insert element and the wall thickness of the at least one first ring can be dependent on a positioning of the insert element in the bearing interior. For example, with an insert element disposed in a recess in the center of the bearing unit in an axial direction, the ratio between the wall thickness of the outer ring and the material thickness in the radial direction of the insert element can fall between 1 to 1 and 1 to 8. If the insert element is disposed on an axial edge of the bearing unit, the wall-thickness ratio between the material thickness of the outer ring in the radial direction and the material thickness of the insert element in the radial direction can fall between 1 to 1 and 1 to 4. If the insert element is disposed in the center of the bearing unit, in which, however, no recess is provided, as can be the case, for example, with a one-part ring, the wall-thickness ratio between the material thickness of the outer ring in the radial direction and the material thickness of the insert element in the radial direction can fall between 1 to 0.2 and 1 to 2.

The first material and the third material are preferably identical to each other. For example, the component and the at least one insert element can be shaped from the same casting compound and/or from the same casting. Furthermore, the first material and the third material can each be a light metal, such as, for example, aluminum, an aluminum alloy, and/or a magnesium alloy, and the second material can be steel, such as, for example, bearing steel.

According to a further embodiment, the component is a hub of a wheel bearing assembly. In particular, the wheel bearing assembly can be used in a motor vehicle, such as, for example, a truck.

According to a further aspect of the invention, a wheel bearing assembly is proposed that includes a hub that is connectable to a wheel and comprises an above-described bearing unit, the bearing unit being inserted into the hub with press fit.

Further advantages and advantageous embodiments are specified in the description, the drawings, and the claims. Here in particular the combinations of features specified in the description and in the drawings are purely exemplary so that the features can also be present individually or combined in other ways.

BRIEF DESCRIPTION OF THE SEVERAL VIEWS OF THE DRAWINGS

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION OF THE INVENTION

In the following, identical or functionally equivalent elements are designated by the same reference numbers.

Figure 1:
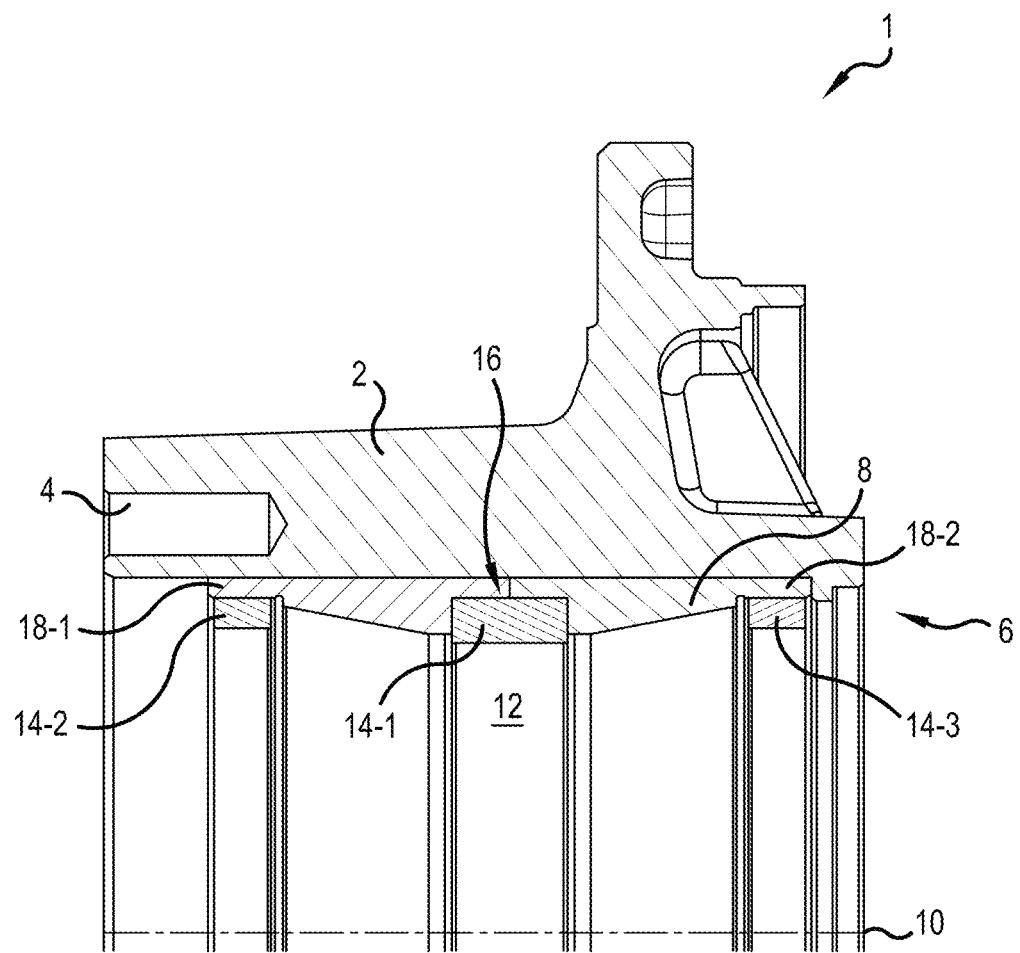
FIG. 1 shows a schematic sectional view through a wheel bearing assembly according to an embodiment.
Figure 2:
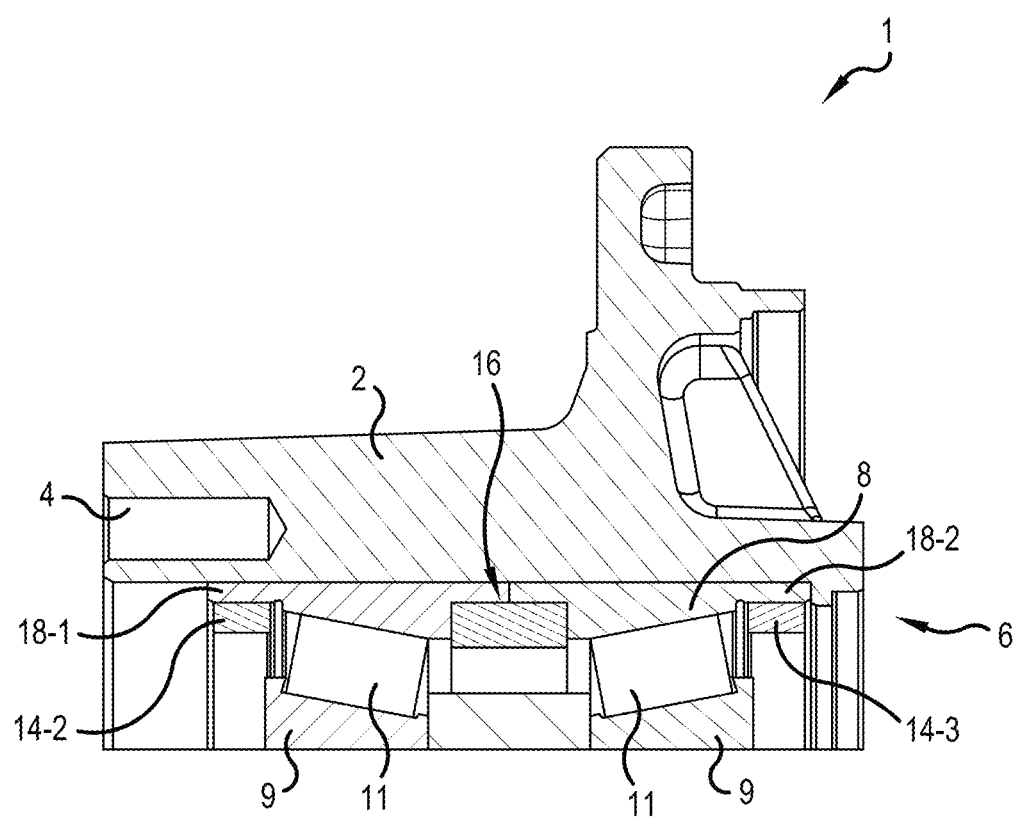
FIG. 2 is another schematic sectional view through the wheel bearing assembly showing second rings and rolling elements.

FIGS. 1 and 2 each shows a wheel bearing assembly 1 that can be used in particular in motor vehicles, such as, for example, a truck. The wheel bearing assembly 1 comprises a component or hub 2 that is formed from a first material with a first coefficient of thermal expansion. For example, the hub or component 2 may be formed from a light metal, such as aluminum. The hub 2 comprises a plurality of attachment openings 4 by which the hub 2 is connectable to a wheel (not shown).

Furthermore, the wheel bearing assembly 1 comprises a bearing unit 6 that includes at least one first ring 8 and at least one second ring 9, in which the first ring 8 and the second ring 9 are rotatable relative to each other about a rotational axis 10, and define a bearing interior 12 between them. In FIG. 2, the first ring 8 is an outer ring and the second ring 9 is an inner ring, but the first ring 8 may alternatively be an inner ring and the second ring 9 may be an outer ring (structure not shown). Also in FIGS. 1 and 2, the first ring 8 is a two-part ring, but may alternatively be a one-part ring. Furthermore, in FIGS. 1 and 2, the first ring 8 is a rotating ring and the second ring 9 is a stationary ring. Alternatively, the first ring 8 is a stationary ring and the second ring 9 is a rotating ring.

The first ring 8 is configured to be attached within the component or hub 2 with a press fit. Furthermore, the first ring 8 is formed from a second material with a second coefficient of thermal expansion that is different from the first coefficient of thermal expansion. In particular, the first coefficient of thermal expansion is higher than the second coefficient of thermal expansion. For example, the first ring 8 may be manufactured from a bearing steel.

In FIG. 2, the bearing unit 6 is a rolling-element bearing unit that includes a first row of rolling elements 11 and a second row of rolling elements 11. The rolling elements 11 are preferably tapered rollers, cylindrical rollers, and/or balls. Alternatively, the bearing unit 6 can also include only one row of rolling elements 11.

The first ring 8 is furthermore provided, on a side facing the bearing interior 12 or the inner surface of the ring 8, with a plurality of insert elements 14-1, 14-2, 14-3. The insert elements 14-1, 14-2, 14-3 are formed from a third material with a third coefficient of thermal expansion, the third coefficient of thermal expansion being at least as high as the first coefficient of thermal expansion. In FIG. 1, the insert elements 14-1, 14-2, 14-3 are also manufactured from light metal, for example aluminum, and preferably made from the same light metal as the hub 2. Alternatively, the bearing unit 6 may also include only one insert element 14-1, only two insert elements 14-2, 14-3 or more than three insert elements (not depicted).

Due to the insert elements 14-1, 14-2, 14-3 having a coefficient of thermal expansion that is substantially at least as high as the coefficient of thermal expansion of the hub 2, the insert elements 14-1, 14-2, 14-3 expand together with the hub 2 at high operating temperatures, or contract together at low operating temperatures. In other words, at high operating temperatures, the insert elements 14-1, 14-2, 14-3 expand to a greater degree than the first ring 8 so that the insert elements 14-1, 14-2, 14-3 deform the first ring 8. A secure seat of the bearing unit 6 in the hub 2 can thus be ensured even when, due to the high operating temperature, the hub 2 expands to a greater degree than the first ring 8. In the case of a low operating temperature, the insert elements 14-1, 14-2, 14-3 contract together with the hub 2 so that the deformation of the first ring 8 due to the insert elements 14-1, 14-2, 14-3 decreases as the temperature becomes lower. This makes it possible to avoid a failure of the hub 2 and/or a blocking or disrupting of the bearing function of the bearing unit 6.

In FIG. 1, the first insert element 14-1 is provided in the center in the axial direction between the two rolling element rows. Furthermore, the second insert element 14-2 is disposed on a first axial outer side in the region of a first shoulder 18-1 of the first ring 8, and the third insert element 14-3 is disposed on a second axial outer side, opposite the first axial outer side, in the region of a second shoulder 18-2 of the first ring 8. The entire first ring 8 can thus be deformed locally in a total of three regions so that the bearing unit 6 can be secured in the hub 2. In particular, a recess and/or groove can be provided on the shoulders 18-1, 18-2 into which the insert elements 14-2, 14-3 can be pressed.

In FIG. 1, the first insert element 14-1 is disposed in a recess 16 that is formed in the first ring 8. The recess 8 has the advantage that the first insert element 14-1 is disposed in a region in which a material thickness is as small as possible in the radial direction of the first ring 8 so that the insert element 14-1 can deform the first ring 8. The second and third insert element 14-2, 14-3 are each disposed in regions in which the first ring 8 also has a lesser material thickness in the radial direction. Preferably, the insert elements 14-1, 14-2, 14-3 are inserted with a press fit into the first ring 8 or into the recess 16.

The ratio of the material thicknesses in the radial direction between the respective insert element 14-1, 14-2, 14-3 and the wall thickness of the first ring 8 can be dependent on a position of the insert element 14-1, 14-2, 14-3. For example, with an insert element, such as, for example, the first insert element 14-1, being disposed in a recess in the center in the axial direction of the bearing unit 6, the ratio between the wall thickness of the outer ring 8 and the material thickness in the radial direction is preferably between 1 to 1 and 1 to 8. For the second and third insert element 14-2, 14-3, which are each disposed on an axial edge of the bearing unit 6, the wall-thickness ratio between the material thickness of the first ring 8 in the radial direction and the material thickness of the respective insert element 14-1, 14-3 in the radial direction preferably falls between 1 to 1 and 1 to 4.

In summary, by the providing of the at least one insert element 14-1, 14-2, 14-3, a relative rotation of the pressed-in first ring 8 with respect to the hub 2 is prevented in the high operating temperature range. This makes it possible that critically high circumferential stresses in the hub 2 can be reduced so far in the low operating temperature range that they remain significantly below the permissible material limit.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims

REFERENCE NUMBER LIST

1 Wheel bearing assembly
2 Hub
4 Attachment opening
6 Bearing unit
8 First ring
9 Second ring
10 Axis of rotation
11 Rolling element
12 Bearing interior
14-1, 14-2, 14-3 Insert element
16 Recess
18-1, 18-2 Shoulders

I claim:

1. A bearing unit comprising:
at least one first ring;
at least one second ring, the at least one first ring and the at least one second ring being rotatable relative to each other and defining a bearing interior between the at least one first ring and the at least one second ring;
a component formed of a first material with a first coefficient of thermal expansion, the at least one first ring being configured to be attached to the component with a press fit and formed from a second material with a second coefficient of thermal expansion different than the first coefficient of thermal expansion; and
an insert element provided on the at least one first ring on a side facing the bearing interior, the at least one insert element being formed from a third material with a third coefficient of thermal expansion, the third coefficient of thermal expansion is substantially at least as high as the first coefficient of thermal expansion;
wherein the bearing unit is a rolling-element bearing unit that includes at least one first row of rolling elements and at least one second row of rolling elements, the at least one insert element being disposed axially centered between the two rows of rolling elements.

2. The bearing unit according to claim 1, wherein the second coefficient of thermal expansion has a value less than a value of the first coefficient of thermal expansion.

3. The bearing unit according to claim 1, wherein the at least one first ring has a reduced radial thickness within the region of the at least one insert element.

4. The bearing unit according to claim 1, wherein the side of the at least one first ring facing the bearing interior is provided with a recess and the at least one insert element is disposed within the recess.

5. The bearing unit according to claim 4, wherein the at least one insert element is press fit within the recess of the at least one first ring.

6. The bearing unit according to claim 1, further comprising at least one other insert element is disposed on an axial outer side of the bearing unit.

7. The bearing unit according to claim 6, wherein the at least one other insert element includes an insert element disposed on a first axial outer side of the bearing unit and an insert element disposed on a second axial outer side opposite the first axial outer side.

8. The bearing unit according to claim 1, wherein the at least one first ring includes a first part and a second part and the at least one insert element is disposed within a region in which the first part and the second part abut against each other.

9. The bearing unit according to claim 1, wherein the third coefficient of thermal expansion is substantially equal to the first coefficient of thermal expansion.

10. The bearing unit according to claim 1, wherein the first material and the third material are identical to each other.

11. The bearing unit according to claim 1, wherein the first material and the third material are each aluminum and the second material is steel.

12. The bearing unit according to claim 1, wherein the component is a hub of a wheel bearing assembly.

13. The bearing unit according to claim 12, wherein the hub is configured to connect to a wheel.

14. A bearing unit comprising:
at least one first ring;
at least one second ring, the at least one first ring and the at least one second ring being rotatable relative to each other and defining a bearing interior between the at least one first ring and the at least one second ring;
a component formed of a first material with a first coefficient of thermal expansion, the at least one first ring being configured to be attached to the component with a press fit and formed from a second material with a second coefficient of thermal expansion different than the first coefficient of thermal expansion; and
an insert element provided on the at least one first ring on a side facing the bearing interior, the at least one insert element being formed from a third material with a third coefficient of thermal expansion, the third coefficient of thermal expansion is substantially at least as high as the first coefficient of thermal expansion;
wherein the at least one first ring includes a first part and a second part and the at least one insert element is disposed within a region in which the first part and the second part abut against each other.

* * * * *